H. D. CURRIER AND H. H. IDE.

AUTOMATIC TEST AND RINGING CIRCUITS.

APPLICATION FILED SEPT. 9, 1920.

Reissued Jan. 31, 1922. 15,277.

Inventors
Hiram D. Currier
Harry H. Ide
By Curtis B. Camp.
Attorney

UNITED STATES PATENT OFFICE.

HIRAM D. CURRIER, OF CHICAGO, AND HARRY H. IDE, OF LA GRANGE, ILLINOIS, ASSIGNORS TO KELLOGG SWITCHBOARD & SUPPLY COMPANY, OF CHICAGO, ILLINOIS, A CORPORATION OF ILLINOIS.

AUTOMATIC TEST AND RINGING CIRCUITS.

15,277. Specification of Reissued Letters Patent. Reissued Jan. 31, 1922.

Original No. 1,311,156, dated July 29, 1919, Serial No. 19,169, filed April 5, 1915. Application for reissue filed September 9, 1920. Serial No. 409,252.

*To all whom it may concern:*

Be it known that we, HIRAM D. CURRIER and HARRY H. IDE, citizen of the United States of America, residing in Chicago and La Grange, respectively, county of Cook, and State of Illinois, have invented certain new and useful Improvements in Automatic Test and Ringing Circuits, of which the following is a specification.

Our invention relates to telephone exchange systems in which link or cord circuits are employed and has to do more particularly with systems in which automatic ringing or signaling means and an automatic busy test is provided, and has for its object the provision of a novel and improved system of the above type. Hitherto in telephone systems employing automatic busy testing means, it has been customary to include either marginal or polarized relays. Such systems are found to be unreliable and objectionable in certain respects. For example, should a plurality of calling connections be extended to a called line at the same time, thus connecting the testing relays of the different link circuits in multiple, it has been found that the marginal relays will fail to operate satisfactorily, due to the low resistance path established by connecting a plurality of these relays in multiple, and the result is that a plurality of calling connections are connected to the line of the called subscriber at the same time. To overcome these objections we have arranged the testing means in the form of a Wheatstone bridge, so that the action of the testing relay is made positive and not marginal. The testing relay either receives its full strength of current or no current at all, and this testing condition is maintained no matter how may connections are extended to the called line at the same time.

Figure 1:
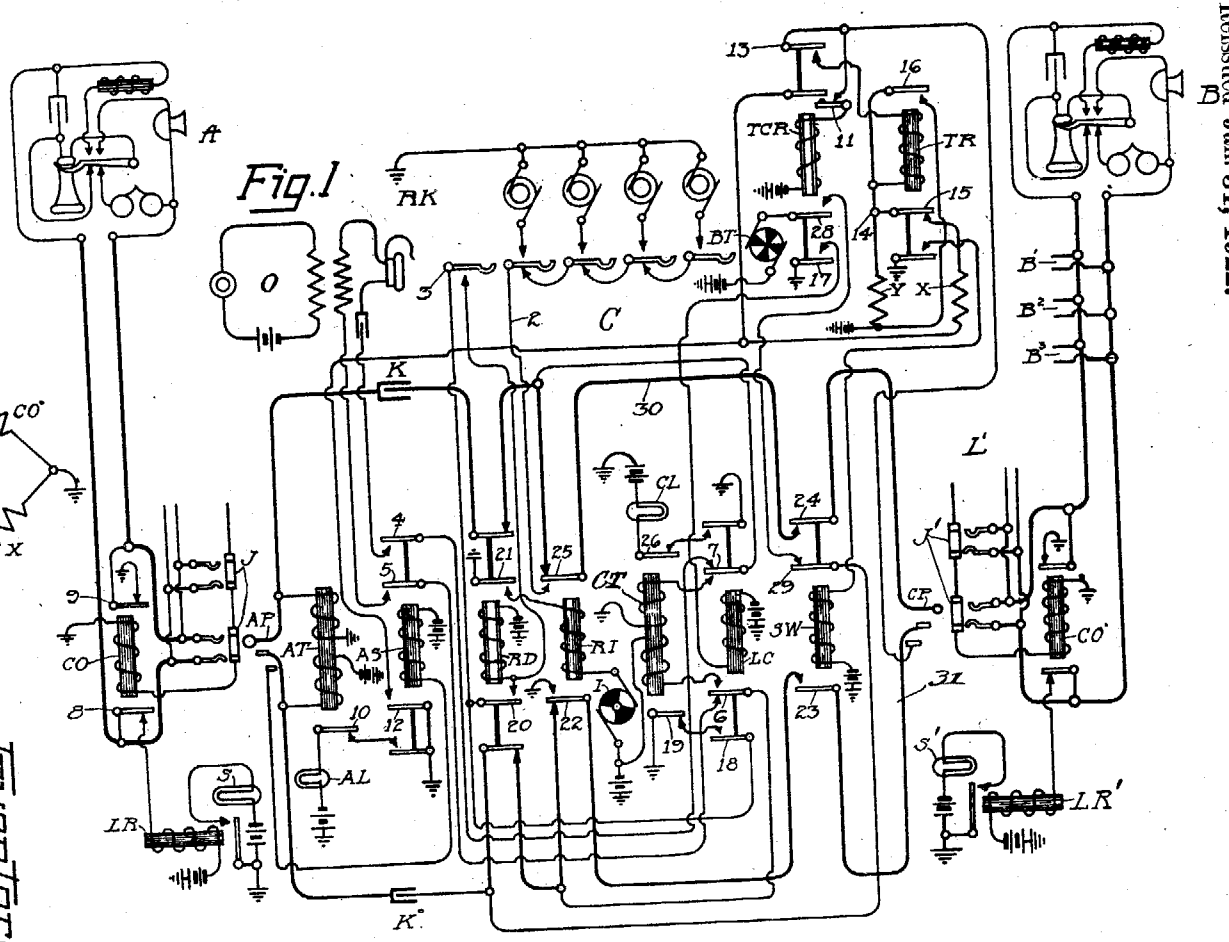
Figure 2:
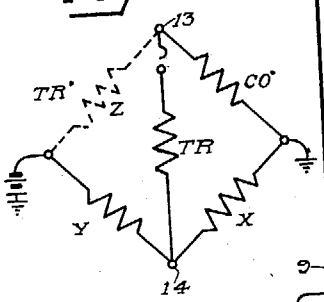

Referring now to the accompanying sheet of drawings, Figure 1 diagrammatically represents a circuit connection between a calling substation A and a called substation B connected through the medium of the link circuit C. Figure 2 shows diagrammatically the test circuit that is established at the time a connection is extended to the line of the called subscriber. This circuit will be hereinafter more fully described. The common battery substations A and B terminate in the central office equipment in the line circuits L and L′, respectively. The substation A may be of any desirable or suitable type, and, as shown, is of the well-known Kellogg common battery type. The line circuit L comprises a line relay LR, cut-off relay CO, line signal S and the multiple jacks J. The substation B and line circuit L′ are similar in all respects to substation A and line circuit L, except that a plurality of substations are connected to the line conductors terminating in the central exchange, the stubs of which are shown at B′, $B^2$ and $B^3$.

The cord circuit C comprises an answering plug AP and a calling plug CP, the two plugs being connected by the heavily marked conductors shown and having the condensers K and K′ interposed. Associated with the answering end of the cord circuit is a double-wound answering tip supervisory relay AT and an answering sleeve supervisory relay AS, the two relays controlling the circuit of the answering supervisory lamp AL. At the calling end of the cord circuit C is a calling tip supervisory relay CT, a listening control relay LC and a switching relay SW. The calling tip supervisory relay CT and listening control relay LC control the circuit of the calling supervisory lamp CL. A party-line ringing the key RK is shown for connecting one of a plurality of generators to the common generator lead 2, and for controlling the circuit of the ringing control relay RD. The ringing control relay RD controls the normal connection extending between the answering plug AP and the calling plug CP, and also controls the circuit of the ringing interrupter relay RI. The ringing interrupter relay RI, through the medium of the interrupter I, operates to intermittently apply ringing current to the line of the called subscriber. The operator's set O is operatively connected to the strands of the cord circuit through the alternate contacts 4 and 5 of the answering supervisory relay AS when connection is established to the line of a calling subscriber and is disconnected therefrom at normal contacts 6 and 7 of the listening control relay LC when connection is established to the line of the called subscriber. The testing relay TR associated with the calling end of the cord circuit determines whether or not a connection is to be extended to the line of the called subscriber, that is, whether ringing current is to be applied to the line of the called subscriber or whether the busy tone generator BT is to be connected to the line of the calling subscriber. We preferably arrange the resistances of the coils X and Y, of the test relay TR and of the cut-off relay CO′, equal. The reason for this will hereinafter appear.

Having described in a general way the apparatus embodying the preferred form of our invention, we will now describe more in detail the operation of the said apparatus in establishing a connection between a calling and a called substation.

Assuming now that the subscriber at the substation A desires a connection with the substation B, the subscriber at substation A removing his receiver from the switchhook, closes an energizing circuit through the line relay LR, traced from battery through the winding of said line relay, normal contact 8 of the cut-off relay CO, to and through the substation A, and through the normal contact 9 of relay CO to ground. The line relay LR, upon energizing, closes a circuit through the line lamp S, thus notifying the operator that the subscriber at substation A desires to make a call. The operator upon noting the glowing of line lamp S inserts the answering plug AP of the cord circuit C into jack J of the calling subscriber's line equipment. The insertion of the answering plug AP into the jack J closes a series energizing circuit through the cut-off relay CO and the answering sleeve supervisory relay AS, traced from battery through the winding of said answering sleeve supervisory relay AS, sleeve contact of the plug AP and jack J and through the cut-off relay CO to ground. The cut-off relay CO, upon energizing, disconnects the line relay LR from the line of the calling subscriber. The answering sleeve supervisory relay AS, upon energizing, connects operator's set O through its alternate contacts 4 and 5 to the cord circuit C. A further result due to the insertion of the plug AP into the jack J, is the closing of a circuit through answering tip supervisory relay AT. The answering tip supervisory relay AT, upon energizing, prevents a premature glowing of the answering supervisory lamp AL by opening of its contact 10. The operator now inquires the wants of the calling subscriber, and assuming that it is the subscriber B that is wanted, the operator, without testing, inserts the calling plug CP into the jack J′ connected to the line of the called subscriber B. Upon the insertion of the calling plug CP into the jack J′, a circuit is closed through the test control relay TCR, traced from battery through the widening of said relay, through its normal contact 11, sleeve contact of the plug CP and jack J′ and through the winding of the cut-off relay CO′ to ground. The test control relay TCR, upon energizing, closes a locking circuit for itself through its alternate contact 11, independent of the cut-off relay CO′, traced from battery through the winding of said relay TCR, its alternate contact 11, alternate contact 12 of answering sleeve supervisory relay AS to ground. A further result due to the energization of test control relay TCR is the closing of a circuit through the listening control relay LC, traced from battery through the winding of the said relay LC and through alternate contact 17 of test control relay TCR to ground. The listening control relay LC, upon energizing, disconnects the operator's set O from the cord circuit C at its normal contacts 6 and 7. The operation of the apparatus so far occurs whether the called line is in an idle or busy condition.

*Assuming the called line idle.*

The test control relay TCR, upon energizing, also closes a circuit through the test relay TR, traced from battery through the resistance Y, the winding of the test relay TR, alternate contact 13 of relay TCR, sleeve conductor of the plug CP and jack J′ and the winding of cut-off relay CO′ to ground. It will be noted that ground is connected through alternate contact 12 of answering sleeve supervisory relay AS, through the resistance X, normal contact 15 of test relay TR to a point intermediate one terminal of the test relay TR and one terminal of the resistance Y. That is, one terminal of the test relay TR is connected through equal resistance Y and X to battery and to ground. Referring to Fig. 2, it will be noted that the resistances X and Y form two arms of the Wheatstone bridge, while the resistance of the cut-off relay CO forms a third arm of the Wheatstone bridge, the fourth arm Z being open (when a line is idle). When the test relay TR is bridged from point 14 to point 13 of the Wheatstone bridge the test control relay TCR is energized. Owing to the unbalanced condition of the Wheatstone bridge (since the fourth arm is opened) the test relay TR receives sufficient current over the above traced circuit to operatively energize. The test relay TR, upon energizing, closes a locking circuit for itself, extending from battery through its alternate contact 16, winding of said test relay TR, contact 13 of test control relay TCR, sleeve contacts of calling plug CP and jack J′, and winding of cut-off relay CO′ to ground. The cut-off relay CO′, upon energizing, disconnects the line relay LR′ from the line of the called subscriber B.

The test relay TR, upon energizing, also closes a circuit through the switching relay SW and disconnects the resistance X from point 14 of the Wheatstone bridge, short-circuits the resistance Y and places itself between battery and point 13 (as shown dotted in Fig. 2). That is, the resistances X and Y are disconnected and the cut-off relay CO′ and test relay TR are connected to form two arms of the Wheatstone bridge to establish a busy condition, as will be hereinafter fully described. The switching relay SW, upon energizing, prevents the applying of the busy tone from busy tone generator BT to the line of the calling subscriber and connects the tip and ring conductors of the calling plug CP to the strands of the cord circuit. The operator now depresses one of the ringing key plungers to connect one of the ringing generators to the common ringing conductor 2 and to close a circuit for ringing control relay RD through its end contact 3. The operator upon removing pressure from the plunger of the ringing key RK, allows the end contacts 3 to return to normal, but connection is maintained between the selected ringing generator and the common ringing lead 2. The circuit for ringing control relay RD extends from battery through the winding of said relay, through end contact 3 of ringing contact RK, alternate contact 18 of listening control relay LC, normal contact 19 of calling tip supervisory relay CT to ground. Ringing control relay RD, upon energizing, closes a locking circuit for itself extending from battery through its winding, through its alternate contact 20, alternate contact 18 of listening control relay LC and normal contact 19 of calling tip supervisory relay CT to ground, and also closes a circuit through the ringing interrupter relay RI, traced from battery through the interrupter I, through winding of said interrupter relay RI and through alternate contact 21 of relay RD to ground. The ringing interrupter relay RI operates to intermittently apply ringing current from the common ringing lead 2 to the line of the called subscriber through the medium of the interrupter I. Upon the response of the called subscriber a circuit is closed through the calling tip supervisory relay CT extending from battery through lower winding of said relay, alternate contact 6 of the listening control relay LC, normal contact 22 of the relay RI, alternate contact 23 of relay SW, ring conductor of the calling plug CP and jack J′, to and through the substation B. tip conductor of jack J′ and calling plug CP, alternate contact 24 of relay SW, normal contact 25 of relay RI, alternate contact 7 of relay LC and through the upper winding of the said calling tip supervisory relay CT to ground. The calling tip supervisory relay, upon energizing, opens the circuit of the calling supervisory lamp CL at its contact 26 and opens the circuit of the ringing control relay RD at its contact 19. The ringing control relay RD, upon de-energizing, opens the circuit of the ringing interrupter relay RI at its contact 21 and closes connection between the calling and called end of the cord circuit C. The subscribers may now carry on conversation over the heavily marked conductors.

Assuming now that the subscribers have completed their conversation, the calling subscriber A, upon replacing his receiver, opens the circuit of answering tip supervisory relay AT at the switchhook contacts. The answering tip supervisory relay AT, upon re-energizing, closes a circuit through the answering supervisory lamp AL at its contact 10. The called subscriber upon replacing his receiver open the circuit of calling tip supervisory relay CT at the switchhook contacts at the substation, allowing the said relay CT to de-energize. Relay CT upon de-engerizing, closes a circuit through the calling supervisory lamp CL at its contact 26. The operator, upon noting the answering supervisory lamp AL and the calling supervisory lamp CL glowing, removes answering plug AP and calling plug CP from their respective jacks J and J′, allowing the apparatus of the cord circuit C and cut-off relays CO and CO′ of the calling and called line circuits L and L′ to return to normal.

*Called line busy.*

If the line of the called subscriber is busy, the winding of the test relay TR of the connected link circuit and the winding of the cut-off relay CO′ will be connected to point 13 of the Wheatstone bridge, as shown in Fig. 2, and as hereinbefore described. Now, upon insertion of the calling plug CP of the calling link circuit into jack J′ of the called subscriber, the test control relay TCR will energize (the same as heretofore described), but the test relay TR will fail to receive current, as it is bridged across points 13, 14 of the Wheatstone bridge and since the arms of the bridge are now in balance. The relay TR failing to energize, fails to close a circuit through switching relay SW. Since switching relay SW does not energize, the tip and ring conductors of the calling plug CP are not connected to the strands of the cord circuit C, but the busy tone from the busy generator BT will be applied to the line of the calling subscriber A. This circuit may be traced from battery through the busy tone generator BT, alternate contact 28 of relay TCR, normal contact 29 of relay SW, through the condenser K′ to and through calling substation A and back through the upper winding of answering tip supervisory relay AT to ground. Now, when the operator presses a plunger of the ringing key RK to initiate the operation of the automatic ringing apparatus, current will not reach the line of the called subscriber as the tip and ring conductors of the plug CP are disconnected from the strands 30 and 31 of the cord circuit C at contacts 24 and 23 of the switching relay SW. The calling subscriber upon receiving the busy signal replaces his receiver upon the switchhook and opens the circuit of answering tip supervisory relay AT. The answering tip supervisory relay AT, upon de-energizing, closes a circuit for answering supervisory lamp AL. The operator noting the glowing of lamps AL and CL, removes plugs AP and CP from their respective jacks.

Assuming now that a plurality of connections are extended to the line of the called subscriber by way of the multiple jacks J′, it is to be noted that the balance of the Wheatstone bridge is unaffected, and that the test relay TR and the resistances X and Y will be connected in in the manner shown in Fig. 2, thus always maintaining the balance of the bridge and preventing any current whatever from flowing through the windings of the test relays TR of the calling line circuits.

While we have illustrated a preferred embodiment of our invention, it is apparent that it may be applied in various ways, and also that many modifications and changes will readily suggest themselves to those skilled in the art. Therefore, we do not desire to be limited to the exact structure as shown, but aim to cover all that which comes within the spirit and scope of the appended claims.

Having described our invention, what we claim as new and desire to secure by United States Letters Patent, is:

1. A telephone system including a manual link circuit having a calling terminal, a called telephone line, manual means for connecting the calling terminal of said link circuit to said called telephone line, a test relay for testing the busy or idle condition of said called line, said test relay being normally disconnected from said calling terminal, a relay for connecting said test relay to said calling terminal whereby said test relay is supplied with current and operatively energized if said line is idle, and is deprived of all current if said line is busy.

2. A telephone system comprising a link circuit having a calling terminal, a called telephone line, manual means for connecting said calling terminal thereto, a test relay for said link circuit, means for supplying current to said test relay if said line is idle, means for preventing the flow of current through the said relay if the line is busy, and a second relay dependent upon the operation of the said test relay for operatively connecting the said link circuit to the said called line.

3. A telephone system comprising a link circuit provided with a plug terminal, a called telephone line and means for connecting said plug terminal to said line, a test relay for testing the busy or idle condition of said called line, means for supplying current to said test relay if said line is idle, means for preventing the flow of current through the said relay if the line is busy, and a second relay dependent upon the operation of the said test relay for connecting a busy signal to the answering end of the said link circuit.

4. A telephone system including a manual link circuit having a three-conductor calling terminal, a called subscriber's line, manual means for connecting the said terminal to the said called line, a test relay normally disconnected from said calling terminal, a relay for connecting said test relay to said calling terminal whereby said test relay receives sufficient current to operatively energize if the called line is idle, but is entirely deprived of current if the called line is busy, and means controlled by said test relay upon energization to operatively associate said link circuit with the said called line.

5. A telephone system including a link circuit having a three-conductor calling terminal therefor, a called subscriber's line, manual means for connecting the said terminal to the called line a testing relay normally disconnected from said terminal, said test relay being adapted to determine the operative connection between said link circuit and said line, a second relay for connecting said test relay to said terminal whereby said test relay then receives current sufficient for it to operatively energize if the called line tests idle, but is entirely prevented from receiving any current whatsoever if the called line tests busy.

6. The combination of a called subscriber's line and a three-conductor manually controlled terminal for connection with said line, a test relay connected to a conductor of said terminal, means for closing a circuit through the said test relay if the called line tests idle, means for preventing a flow of current through the said test relay if the called line tests busy, and a relay controlled by said test relay for operatively connecting the said link circuit to the subscriber's line.

7. The combination of a called subscriber's line and a link circuit provided with a three-conductor terminal for connection with said line, a test relay connected to a conductor of said terminal, means dependent upon the condition of said called line for either closing a circuit through the said relay if the line tests idle or for preventing a flow of current through the said relay if the line tests busy, and an electromagnet controllable by said testing relay for operatively connecting the said link circuit to the subscriber's line.

8. A telephone system comprising a link circuit having a terminal therefor, a called subscriber's line circuit and means for connecting the said terminal thereto, testing means associated with the said link circuit comprising a test relay and various resistances adapted to be connected in the form of a Wheatstone bridge for testing the busy or idle condition of the said called line.

9. A telephone system comprising a link circuit having a terminal, a called subscriber's line circuit having a cut-off relay associated therewith, means for connecting the said terminal with the line circuit, a test relay and a plurality of resistance coils for said link circuit, means for connecting the said resistance coils and the said cut-off relay to form arms for a Wheatstone bridge, means for connecting the said test relay across opposite points of the said bridge, and means dependent upon the condition of said called line for either supplying or preventing the flow of current through the said test relay.

10. A telephone system including a called subscriber's line, a manually controlled link circuit adapted to be connected to said line, a test relay for said link circuit for testing the busy or idle condition of said called line, and a second relay for connecting said test relay to a terminal of said line whereby said test relay receives current to operatively energize if said line is idle, or is prevented from receiving any current whatsoever if said line is busy and remains in its normal position.

11. A telephone system including subscribers' telephone lines, a link circuit provided with a pair of terminals for interconnecting said lines, a test relay for said link circuit, means for either supplying or depriving said relay of current when connected to a called one of said lines according to whether said line is in an idle or a busy condition, and a relay controlled by said test relay for operatively connecting the said link circuit to the subscriber's line.

12. A telephone system including a called subscriber's line, a manually controlled link circuit provided with testing apparatus, said apparatus including a test relay having one of its terminals connected to both poles of a battery, means for connecting said apparatus to said telephone line whereby said apparatus is deprived or receives current according to the busy or idle condition of the called telephone line.

13. A telephone system including a called subscriber's telephone line, a manual link circuit provided with a testing device, a ringing current generator and a busy signaling device associated with said link circuit, means for associating said testing device with said subscriber's line whereby said test device receives operating current to connect said ringing current generator to said line if said line is idle, or said relay is entirely deprived of current and said busy signaling device is operatively connected to a calling subscriber's line if said called line is busy.

14. A telephone system including a subscriber's telephone line provided with multiple terminals, manual link circuits for connection to said line through said terminals, testing apparatus for each of said link circuits normally disconnected from the terminals of said link circuits, said testing apparatus being so arranged that when said line is tested as a busy line said apparatus is entirely deprived of current no matter how many link circuits are connected to the line at the time said last link circuit is connected thereto.

15. A telephone system including a busy subscriber's telephone line, a manual link circuit provided with a calling terminal, a test relay for said link circuit normally disconnected from said terminal, a second relay, operator-controlled means for connecting said link circuit to said line, thereby operating the said second relay to connect said test relay to said busy line whereby said test relay is deprived of current due to the busy condition of the subscriber's line, and an audible busy signal adapted to be transmitted to the other end of said link circuit by said second relay.

16. A telephone system including a called subscriber's line, a battery, a manually controlled link circuit provided with a test relay having its one terminal connected through resistances to the opposite poles of said battery, means for connecting said link circuit and testing relay to said telephone line whereby said relay will be deprived of or will receive current, according to the busy or idle condition of said called telephone line.

17. A telephone system including a link circuit provided with a terminal, a subscriber's line provided with a terminal for receiving said link circuit terminal, testing means for said link circuit including a test relay and various resistances adapted to be connected in the form of a Wheatstone bridge for testing said line.

18. A telephone system including a subscriber's telephone line, a link circuit provided with a test relay connected to the opposite poles of a battery, a test contact for said telephone line adapted to be connected to one pole of said battery or to the opposite poles of said battery, means for connecting said link circuit to said telephone line whereby if said test contact is connected to only one pole of said battery, said test relay will be energized to operatively connect said line to said link circuit, and if said test contact is connected to the opposite poles of said battery said test relay will be deprived of operating current and will fail to energize.

19. A telephone system including a subscriber's telephone line provided with multiple terminals, a plurality of link circuits for connection to said line through its said multiple terminals, another link circuit provided with a testing relay also adapted to be connected to said line through one of its multiple terminals, said testing relay being so connected that when said line is tested as a busy line it is deprived of current no matter how many of said first link circuits may be connected to said line.

20. A telephone exchange system including telephone lines extending from substations to a multiple switchboard, a telephone set for each operator's position thereat, link connectors for connecting said substations, means for connecting said set to a calling line by way of one of said link connectors, automatic means to prevent a telephonic connection between a calling line and a busy line when one of said link connectors is connected to said busy line, means for disconnecting said set from said link connector when such a connection is made and for sounding an audible signal in the telephone receiver at the calling substation, denoting said busy condition of the called for line.

Signed by us at Chicago, in the county of Cook and State of Illinois, this 7th day of September, 1920.

HIRAM D. CURRIER.
HARRY H. IDE.